United States Patent
Van Gestel

(10) Patent No.: US 7,826,719 B2
(45) Date of Patent: Nov. 2, 2010

(54) METHOD FOR RECORDING INFORMATION ON A RECORD MEDIUM, RECORD MEDIUM CONTAINING INFORMATION, AND METHOD AND DEVICE FOR READING INFORMATION FROM A RECORD MEDIUM

(75) Inventor: Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1035 days.

(21) Appl. No.: 10/596,599

(22) PCT Filed: Dec. 16, 2004

(86) PCT No.: PCT/IB2004/052830
§ 371 (c)(1),
(2), (4) Date: Jun. 19, 2006

(87) PCT Pub. No.: WO2005/064609
PCT Pub. Date: Jul. 14, 2005

(65) Prior Publication Data
US 2007/0166010 A1    Jul. 19, 2007

(30) Foreign Application Priority Data
Dec. 22, 2003    (EP) ................... 03104912

(51) Int. Cl.
*H04N 5/00*    (2006.01)
*H04N 5/91*    (2006.01)
*H04N 7/00*    (2006.01)

(52) U.S. Cl. .......................... 386/126; 386/46; 386/95; 386/96; 386/98; 386/125

(58) Field of Classification Search .................. 386/1, 386/46, 95–98, 102, 104–106, 124–126
See application file for complete search history.

(56) References Cited

U.S. PATENT DOCUMENTS 6,088,507 A * 7/2000 Yamauchi et al. .............. 386/95
6,907,190 B2 * 6/2005 Kashiwagi et al. ............ 386/125

* cited by examiner

*Primary Examiner*—Marsha D Banks Harold
*Assistant Examiner*—Marc Dazenski

(57) ABSTRACT

A method is described for recording an audiovisual information stream comprising a plurality of alternative parts (VS1; VS2; VS3) and at least one common part (AS1; AS2; GS1; GS2), wherein the alternative parts of the information stream are recorded in an interleaved manner. Each of the alternative information stream parts is divided into alternative information stream blocks (VSB1($i$); VSB2($i$); VSB3($i$)). Each of the common information stream parts is divided into common information stream blocks (ASBI(i); ASB2($i$); GSB1($i$); GSB2($i$)). The information stream is recorded as a succession of consecutive interleaved units (IU(i)), each interleaved unit comprising one corresponding block (ASB 1($i$); ASB2($i$); GSB1($i$); GSB2($i$)) of each of the common information stream parts (AS1; AS2; GS1; GS2) and one corresponding block (VSBI(i); VSB2($i$); VSB3($i$)) of each of the alternative information stream parts (VS1; VS2; VS3), the common information stream blocks being separate from the alternative information stream blocks.

19 Claims, 8 Drawing Sheets

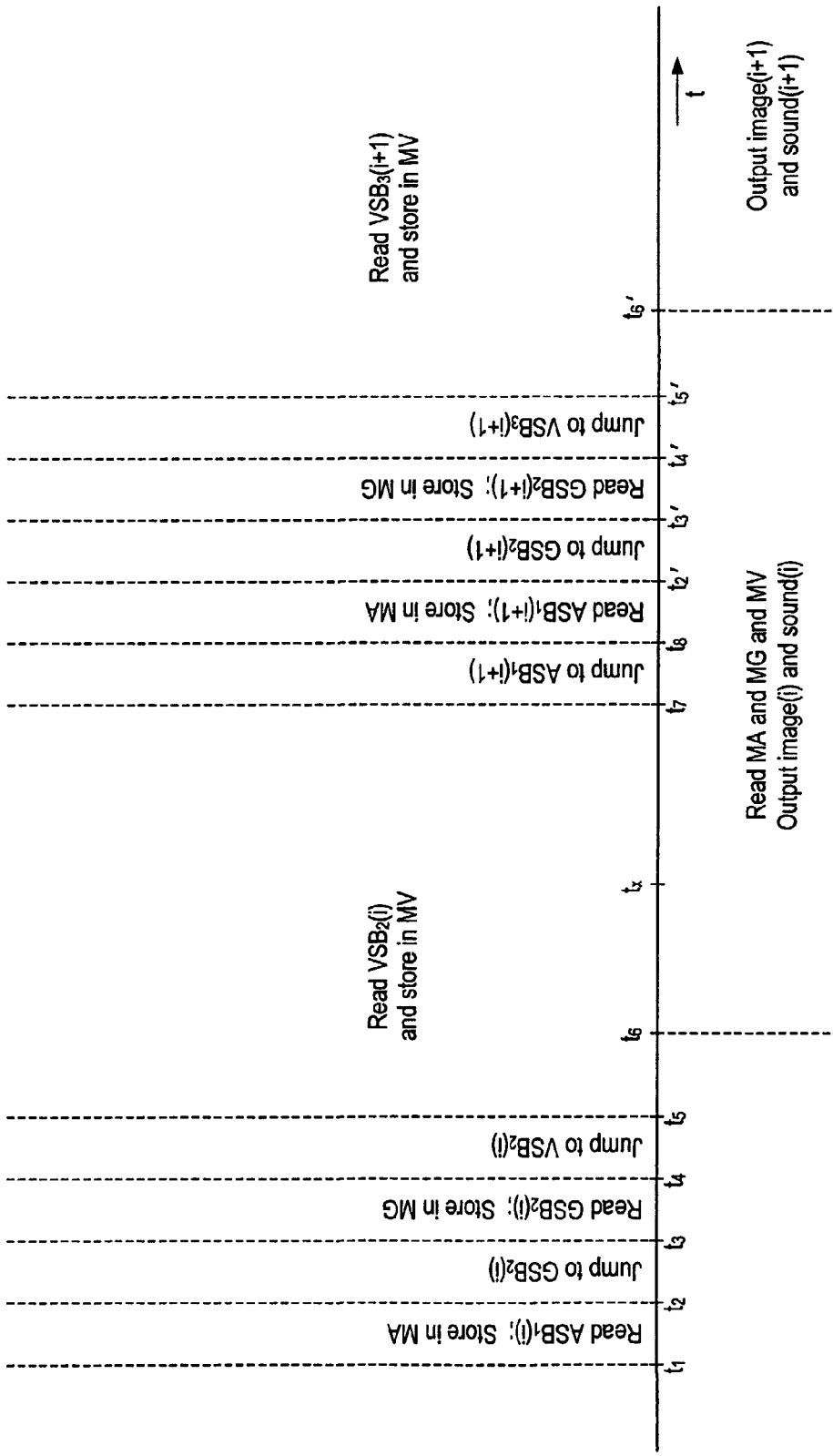

METHOD FOR RECORDING INFORMATION ON A RECORD MEDIUM, RECORD MEDIUM CONTAINING INFORMATION, AND METHOD AND DEVICE FOR READING INFORMATION FROM A RECORD MEDIUM

FIELD OF THE INVENTION

The present invention relates in general to the field of recording information on a record medium and, conversely, reading the recorded information from the record medium.

More particularly, the present invention relates to the field of optical recording, in which case the record medium typically is an optical disc, but the gist of the present invention is not restricted to optically recording information on a disc.

Further, the present invention relates particularly to the field of recording an audio stream and/or a video stream, but the gist of the present invention is not restricted to such use. As will become clearer in the following, the present invention is applicable in more cases where an information stream has a plurality of alternative parts and one or more common parts.

Optical discs and disc drives have been developed according to different standards or formats, such as for instance CD standard, DVD standard, etc. A relatively new standard is BD (Blu-Ray Disc). Specifically, the present invention relates to the field of recording and reading BD-ROM, and the invention will be explained hereinafter specifically for this exemplary application, but it is to be noted that it is not intended to restrict the scope of the invention to BD-ROM.

BACKGROUND OF THE INVENTION

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writeable type, where information may be stored by a user. Since the technology of optical discs in general, the way in which information can be stored in an optical disc, and the way in which optical data can be read from an optical disc, is commonly known, it is not necessary here to describe this technology in more detail.

Optical discs have found widespread use as information carrier, not only for storing computer data, but also for making audio and/or video recordings. Apparatus are available for allowing a user to make his own recordings on writeable discs. Also, audio publishing companies or video publishing companies publish pre-recorded discs, which are read-only discs (ROM); play-back apparatus are available for allowing a user to play such discs. In such play-back apparatus, indicated hereinafter simply as player, a disc drive component reads and decodes the data recorded on disc, and a video stream and/or audio stream is generated, suitable for display via a display device such as a television apparatus, a monitor, a loudspeaker, etc. This is explained in the following example.

A movie may contain several elements, indicated as follows:
Moving pictures, i.e. the actual pictures of the movie, to be displayed on the TV screen. The contents of the moving pictures are stored in a video elementary stream.
Graphics pictures. Graphics pictures are overlayed on the moving pictures like a picture-in-picture presentation. Graphics picture are used for transmitting subtitles. They may consist of background graphics (e.g. a still picture) and some text. The contents of the graphics pictures are stored in a graphics elementary stream, so a user has the option of viewing the movie with or without graphics. Usually, a user is given the option to choose a language, in which case different graphics pictures are provided, associated with different languages. In such case, the movie is accompanied with a set of multiple graphics elementary streams, one for each language.
Audio signals. The audio signal of a movie consists of background audio with spoken text, and this combination is stored in an audio elementary stream. Usually, a user is given the option to choose a language, in which case the spoken text is different for different languages while the background audio is the same for all languages. In such case, the movie is accompanied with a set of multiple audio elementary streams, one for each language.

A combination of multiple elementary streams (for instance: moving pictures+graphics+audio) can be transmitted in one Transport stream. Each transport stream is stored as a separate file.

Traditionally, an information carrier contains only one version of the movie. With the ongoing development of optical discs, especially the increase in data storage capacity, it has become possible for the information carrier to contain two or more versions of the movie, allowing a user to select which version the wishes to see. For instance, one user may wish to see the movie in its original version, but another user may wish to have subtitles. Yet another user may prefer to hear the spoken text in his own language.

According to the state of the art, especially the well-known DVD-VIDEO standard, several different versions of the audio elementary stream and the graphics elementary stream are recorded in one transport stream, packets of the elementary streams being multiplexed in the transport stream. Depending on a user's choice, only one of the several different versions of the audio elementary stream is selected for decoding during playback, and only one of the several different versions of the graphics elementary stream is selected for presentation during playback.

So, it is for instance possible that an original English-language movie is to be published with optional French-spoken text and optional German spoken text. In that case, there is a first audio elementary stream containing the original English-spoken text, a second audio elementary stream containing the French-spoken text (translation 1), and a third audio elementary stream containing the German-spoken text (translation 2).

Also, it is for instance possible that a movie is to be published with English, French and German subtitles. In that case, there is a first graphics elementary stream containing the English text, a second graphics elementary stream containing the French text, and a third graphics elementary stream containing the German text.

The above applies already in the case of only one version of the moving pictures, i.e. video elementary stream. However, it is also possible that the information carrier contains two or more alternative versions of the moving pictures, where the same scene is viewed from different angles. This will be indicated as a multi-angle movie. Since the alternative versions of the moving pictures always relate to the same scene, the audio and graphics may be the same for all these alternative versions.

In theory, it would be possible to multiplex the plurality of alternative video elementary streams into the transport streams. During playback, the entire transport stream would be read, and only the selected video stream, audio stream and graphics stream would be decoded. However, in view of the fact that the bit rate associated with one video elementary stream is already quite high (more than 20 Mbps), this approach would result in very high bit rates, too high in relation to the read rate from the drive which is 54 Mbps for the BD-ROM drive.

According to the above-mentioned DVD-VIDEO standard, this problem is avoided by generating a plurality of individual alternative transport streams associated with the alternative video elementary streams, i.e. each of the plurality of alternative video elementary streams is combined with the same set of multiple audio elementary streams and graphics elementary streams; during playback, only the one transport stream associated with the desired viewing angle is read, and only the selected audio stream and graphics stream is decoded. Thus, the information relating to audio and graphics is recorded multiple times (as many times as the number of alternative video elementary streams). A disadvantage of this approach is that, in case the audio and graphics information is the same for all viewing angles, storage space is wasted.

In principle, it would be possible to store each alternative transport stream as one continuous recording, so that the different transport streams are physically recorded in different disc sections. This would be adequate, if a user could only make a choice at the beginning of the playback. However, in multi-angle video, a user is given the possibility to change from one viewing angle to any of the other viewing angles at any desired moment. This involves, during playback, a jump from the current reading location in the current transport stream to the corresponding reading location in the transport stream of the user's choice. The required jump distance would be large to such extent that a very large video buffer would be necessary to assure continuous display. Also, the time between the user entering his choice (e.g. pressing a button) and the system responding by changing the presentation from one viewing angle to the other viewing angle would be relatively long, to such extent that it is to be expected that the user, getting impatient, presses the button again.

In order to avoid these problems, the above-mentioned DVD-VIDEO standard provides for an interleaved recording of the different transport streams. More particularly, each transport stream is divided into relatively small transport stream pieces, indicated as angle blocks; the angle blocks of the different transport streams are interleaved in one stream. This is schematically illustrated in FIG. 1, which shows the contents of a portion of a track of a record carrier (optical disc), for an illustrative example where a movie is recorded in three different viewing angles. The record carrier contains three different information streams TS1, TS2, TS3.

Each information stream is divided into angle blocks AB1(i), AB2(i), AB3(i), index i indicating the order of display. A combination of three angle blocks AB1(i), AB2(i), AB3(i) is indicated as an interleaved unit IU(i). Each angle block ABj(i)(j=1-3) contains a multiplex of one video elementary stream VSj(i) and multiple audio and graphics elementary streams ASj,k(i) and GSj,m(i). In the example shown, k=1-2 and m=1-3. Within one interleaved unit IU(i), the three audio elementary streams ASj,k(i) of each angle block ABj(i) are mutually identical, and the three graphics elementary streams GSj,m(i) of each angle block ABj(i) are mutually identical.

Assume that a user is watching version 2 of the movie, and has selected the second audio stream AS2,2 and the third graphics stream GS2,3 associated with the second movie version. In respect of interleaved unit IU(i), a disc drive reads angle block AB2(i); at the end of this angle block, the disc drive jumps to the beginning of the next angle block AB2(i+1) of the same transport stream TS2 in the next interleaved unit IU(i+1). Thus, the entire transport stream TS2 is read from disc; the corresponding video stream VS2, the selected audio stream AS2,2 and the selected graphics stream GS2,3 are decoded and displayed.

An important disadvantage of this prior art recording method is that each audio elementary stream is recorded three times, and that each graphics elementary stream is recorded three times (in the above-mentioned example). This consumes storage space, and reduces the total playing time of the disc.

It is an important objective of the present invention to overcome or at least reduce this disadvantage.

SUMMARY OF THE INVENTION

According to an important aspect of the present invention, the video, graphics and audio information is stored as multiple transport streams, i.e. without completely mixing the elementary streams. The graphics information and the audio information relating to one interleaved unit are stored in separate files, whereas the angle blocks only contain the video information of a viewing angle. Thus, in each interleaved unit, the graphics information is only stored once and the audio information is only stored once. During normal play, the selected audio information is read and stored in an audio buffer and the selected graphics information is read and stored in a graphics buffer; then, the video information from the selected angle block is read from disc, and the associated audio information and graphics information is read from the audio buffer and the graphics buffer, respectively. Thus, less storage space is consumed, and the playing time of the disc is increased. As a consequence, it becomes possible to record longer playtime (longer movies or more movies) on the same disc. Further, it becomes possible to provide more movie versions on the same disc (more languages of subtitles and spoken text).

In a variation to this embodiment, two or more of the audio streams may be multiplexed, and/or two or more of the graphics streams may be multiplexed. Advantageously, all audio streams and graphics streams may be multiplexed into one combined audio/graphics stream. During normal play, this combined audio/graphics stream is read and stored in the combined audio/graphics buffer, the selected audio stream is decoded, and the selected graphics stream is decoded. This may be more time-efficient than having individual audio and graphics streams recorded, because one jump (between audio read-out and graphics read-out) is avoided.

BRIEF DESCRIPTION OF THE DRAWINGS

These and other aspects, features and advantages of the present invention will be further explained by the following description with reference to the drawings, in which same reference numerals indicate same or similar parts, and in which:

FIG. 6 is a timing diagram schematically illustrating the timing of the actions of a disc drive according to the present invention during a change of viewing angle.

DESCRIPTION OF THE INVENTION

Figure 1:
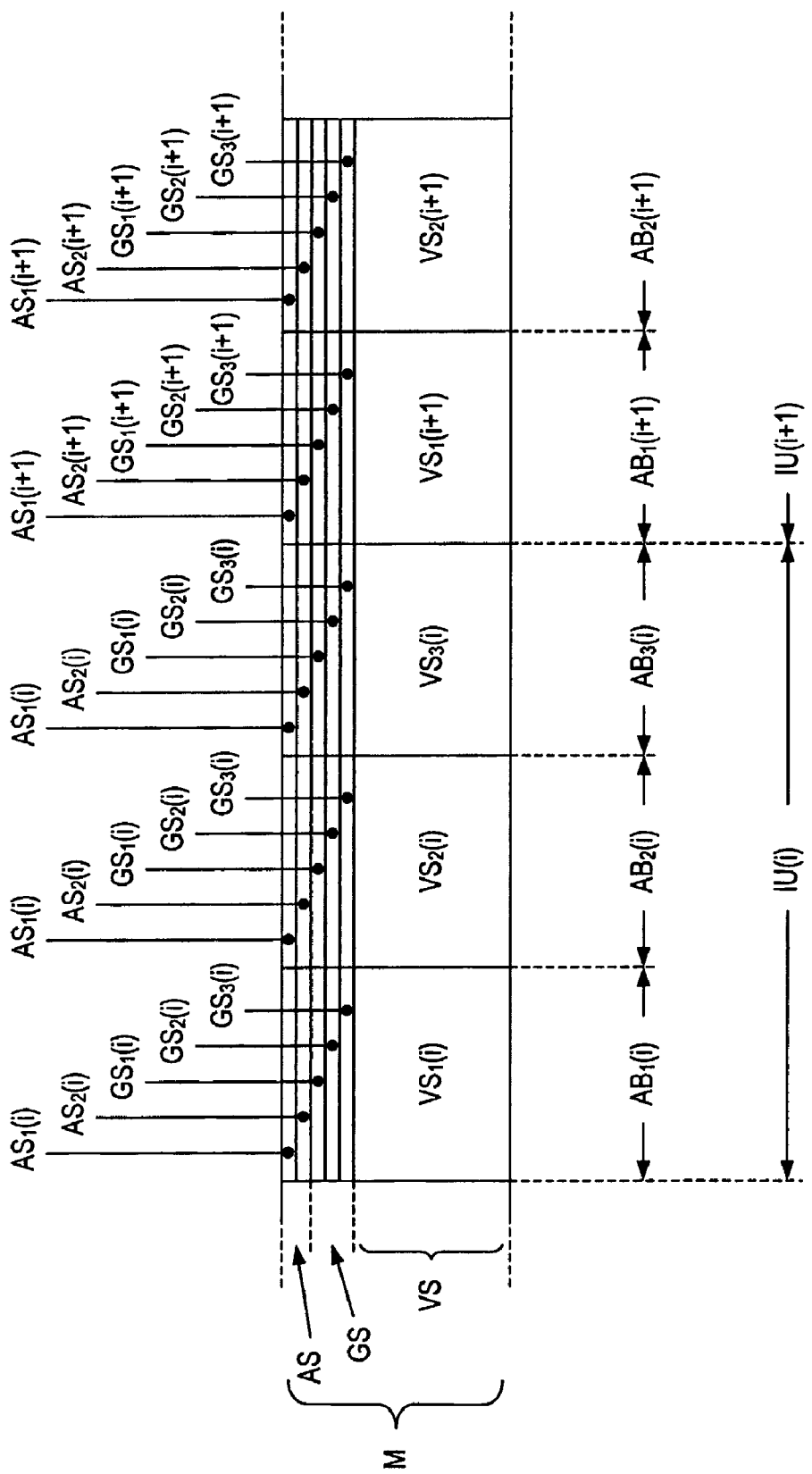
FIG. 1 schematically illustrates a portion of a track of a record carrier to illustrate interleaved recording of multi-angle information according to the state of the art.
Figure 2:
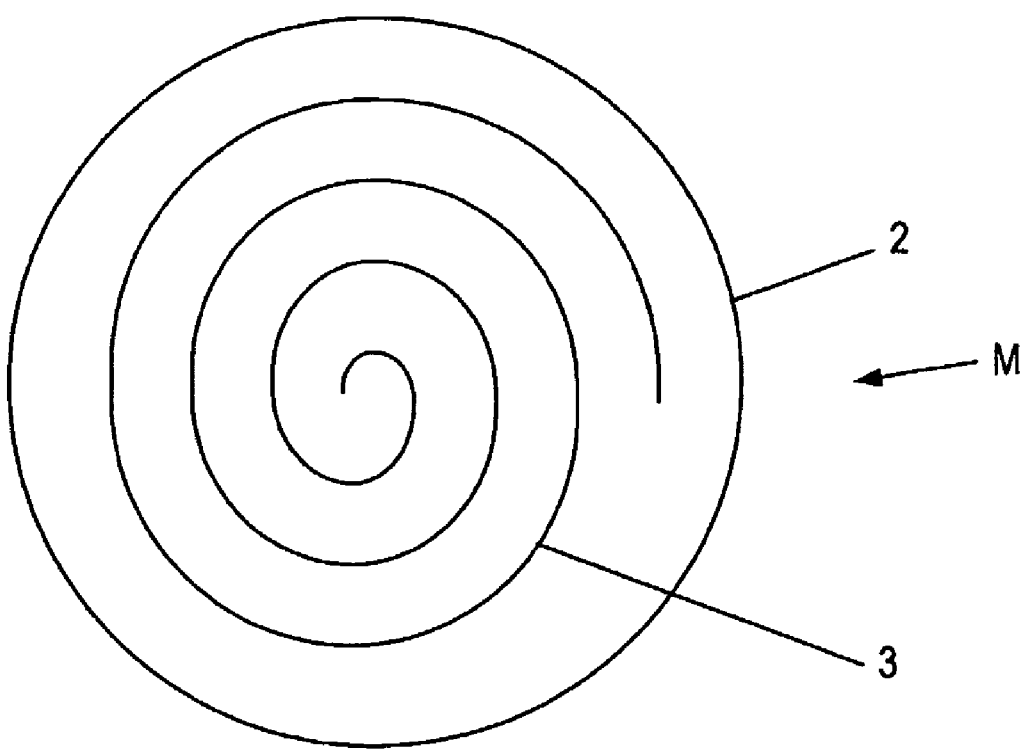
FIG. 2 schematically shows an optical disc.

FIG. 2 schematically illustrates an optical disc 2, more specifically a BD disc, as a preferred example of a record carrier to which the present invention relates. The disc 2 has a track 3, which is shown as one continuous spiral-shaped track but which alternatively may consist of a plurality of mutually concentric circular track portions. The track 3 contains a recording of a multi-angle movie M with, in this example, three alternative versions of the moving pictures, two versions of the graphics pictures, and two versions of the audio signals.

Figure 3A:
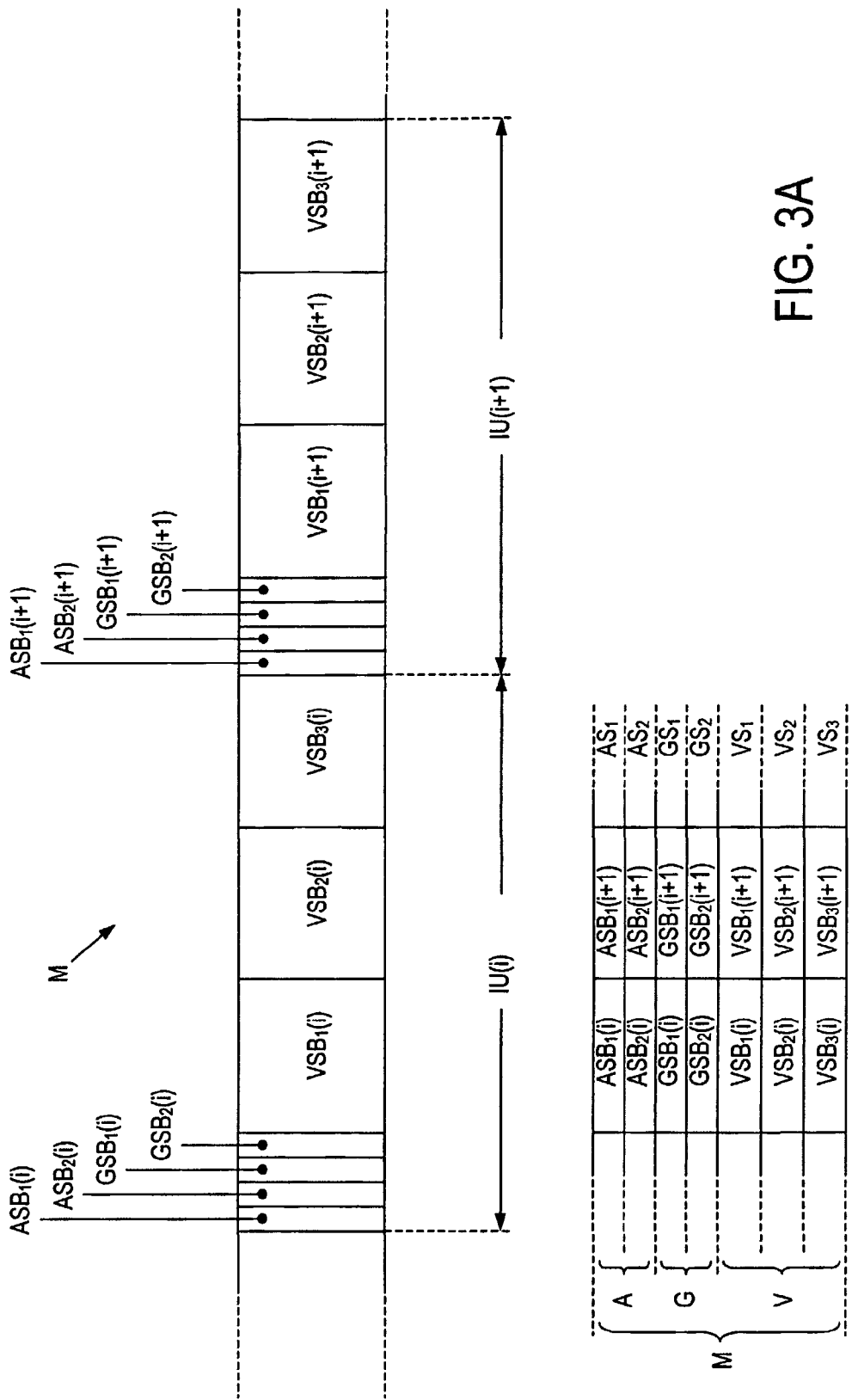
FIGS. 3A and 3B schematically illustrate a portion of a track of a record carrier to illustrate interleaved recording of multi-angle information according to the present invention.
Figure 3B:
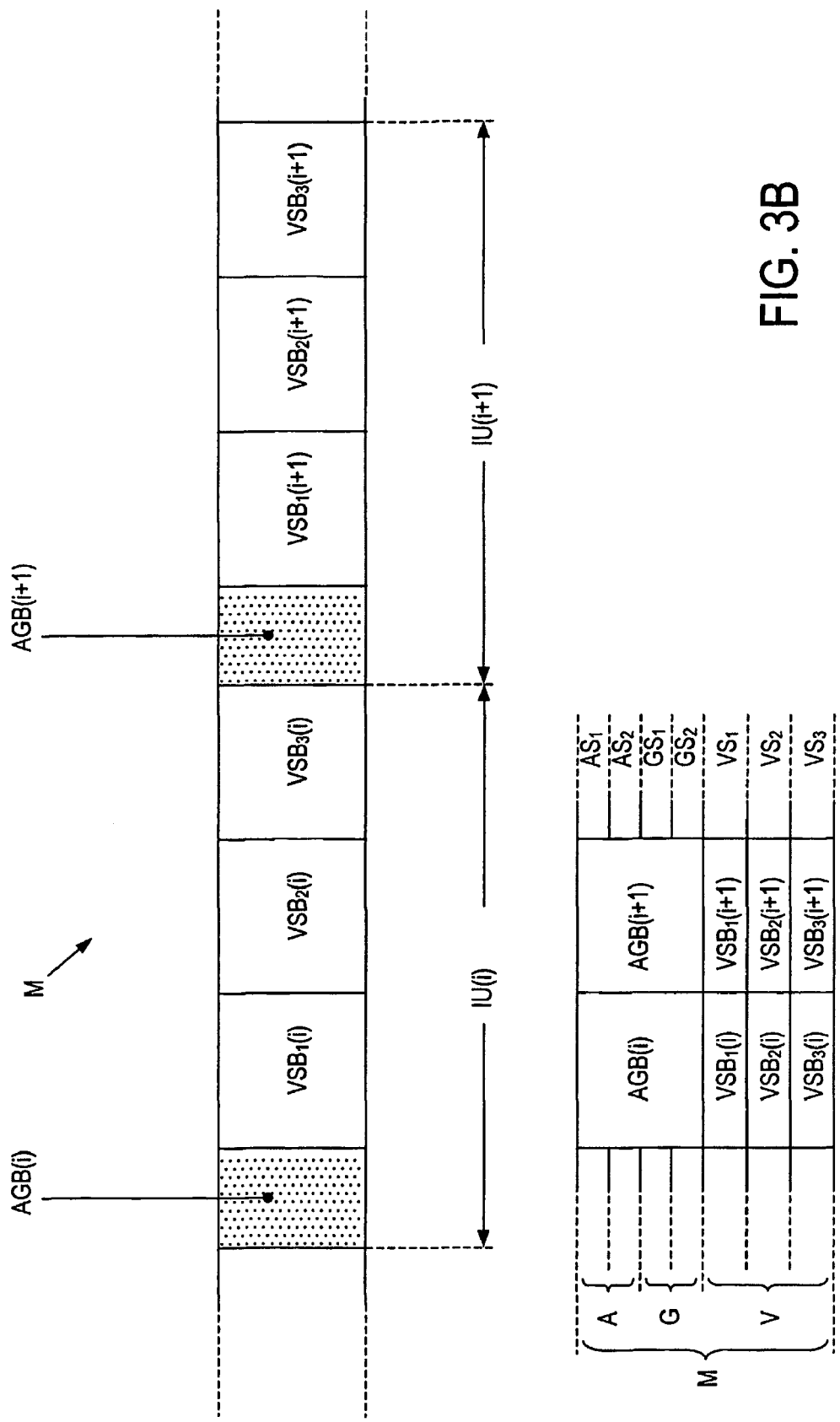

FIGS. 3A and 3B each are a diagram schematically illustrating a portion of the track 3. In the example of FIG. 3A, the two versions of the graphics pictures and the two versions of the audio signals are recorded as individual elementary streams. In the example of FIG. 3B, the two versions of the graphics pictures and the two versions of the audio signals are recorded as a multiplexed audio/graphics stream. In a variation, the two versions of the graphics pictures may be recorded as a multiplexed graphics stream and the two versions of the audio signals may be recorded as a multiplexed audio stream.

The multi-angle movie is divided into a plurality of interleaved units IU. Each interleaved unit IU(i) corresponds to a predetermined amount of playtime. In the example of FIG. 3A, each interleaved unit IU(i) comprises:
- a first audio stream block ASB1(i) having a length corresponding to said predetermined amount of playtime,
- a second audio stream block ASB2(i) having a length corresponding to said predetermined amount of playtime,
- a first graphics stream block GSB1(i) having a length corresponding to said predetermined amount of playtime,
- a second graphics stream block GSB2(i) having a length corresponding to said predetermined amount of playtime,
- a first angle video stream block VSB1(i) having a length corresponding to said predetermined amount of playtime,
- a second angle video stream block VSB2(i) having a length corresponding to said predetermined amount of playtime, and
- a third angle video stream block VSB3(i) having a length corresponding to said predetermined amount of playtime.

In the example of FIG. 3B, each interleaved unit IU(i) comprises:
- a multiplexed audio/graphics stream block AGB(i);
- a first angle video stream block VSB1(i) having a length corresponding to said predetermined amount of playtime,
- a second angle video stream block VSB2(i) having a length corresponding to said predetermined amount of playtime, and
- a third angle video stream block VSB3(i) having a length corresponding to said predetermined amount of playtime.

Said multiplexed audio/graphics stream block AGB(i) comprises:
- a first audio elementary stream block (not shown) having a length corresponding to said predetermined amount of playtime,
- a second audio elementary stream block (not shown) having a length corresponding to said predetermined amount of playtime,
- a first graphics elementary stream block (not shown) having a length corresponding to said predetermined amount of playtime,
- a second graphics elementary stream block (not shown) having a length corresponding to said predetermined amount of playtime.

In the following, the invention will be further explained for the example of FIG. 3A; modifications and adaptations for the example of FIG. 3B will be clear to a person skilled in the art without it being necessary to specifically mention those modifications and adaptations here.

Figure 4:
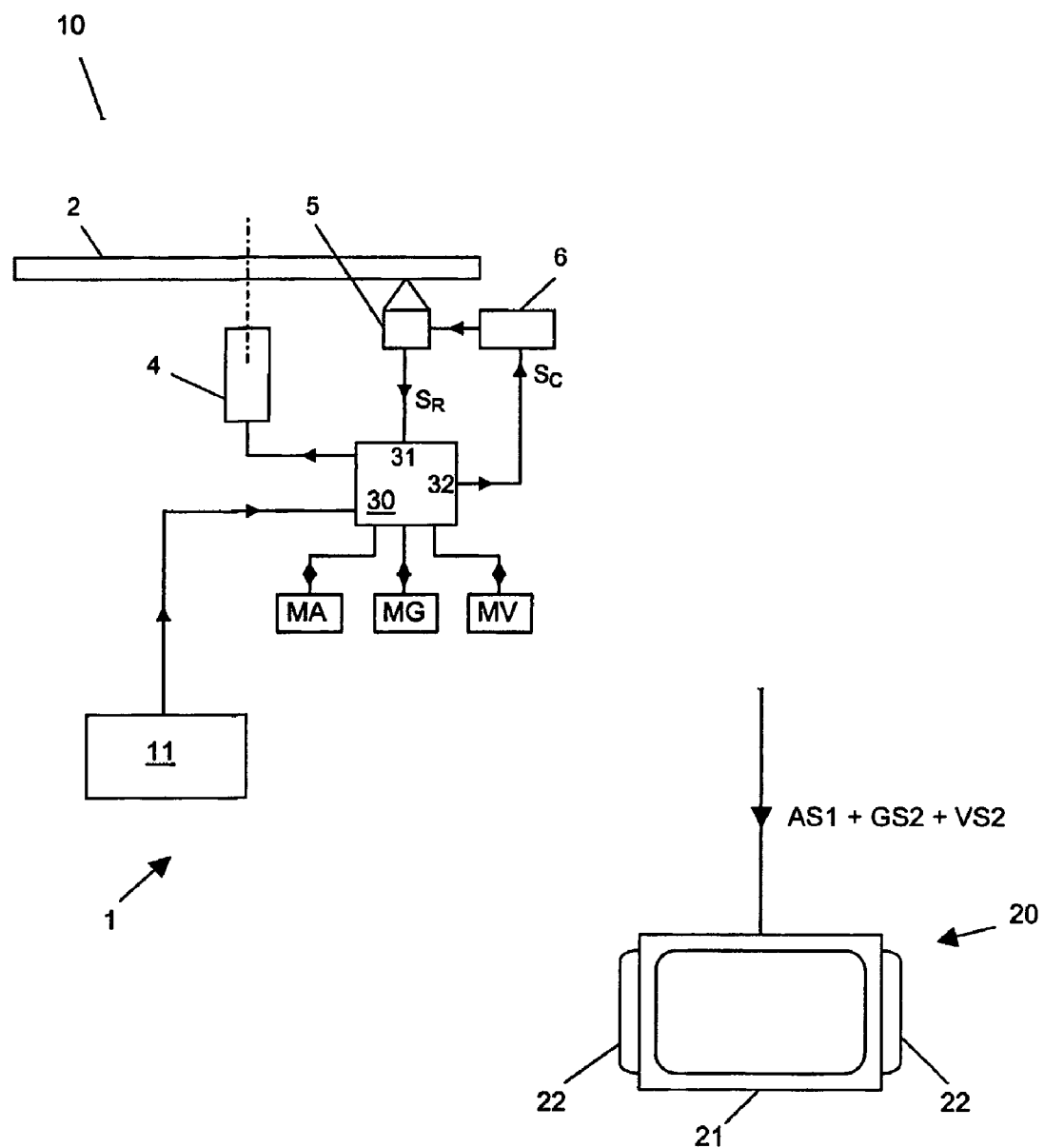
FIG. 4 is a block diagram schematically illustrating an embodiment of an audio/video reproduction system.

FIG. 4 is a block diagram schematically illustrating an embodiment of an audio/video reproduction system 1. The audio/video reproduction system 1 comprises a disc drive 10 and a display device 20, which comprises at least one screen 21 for displaying images and at least one loudspeaker 22 for generating sound. The disc drive 10 is capable of reading information from the disc 2, which disc contains information recorded in accordance with the invention.

The disc drive 10 comprises a disc motor 4 for rotating the disc 2, and an optical head 5 for scanning the track 3 of the rotating disc 2. An actuator device 6 sets the correct positioning of the optical head 5. A controller 30 controls the disc motor 4 and the actuator device 6. The controller 30 has a first input 31 receiving an optical read signal SR from the optical head 5. The controller 30 is designed to generate a control signal SC at a first output 32 for controlling the positioning of the optical head 5.

The controller 30 is provided with an audio buffer memory MA, a graphics buffer memory MG, and a video buffer memory MV. The controller 30 is further provided with a user control panel 11, which comprises user-controllable input means, such as keys, switches, knobs, and the like, allowing a user to enter a selection or a command to the controller 30; since such input means are known per se, they are not shown separately in FIG. 4.

In the following, the operation of the disc drive 10 during normal play will be explained with reference to FIG. 5A, which is comparable with FIG. 3A and illustrates the positioning of the optical head 5 as a function of time t (vertical axis), and with reference to FIG. 5B, which is a timing diagram illustrating the timing of the actions of the apparatus 1.

Assume that a user has made a selection to view the multi-angle movie M with the second viewing angle, the first audio stream and the second graphics stream. With reference to FIG. 5, which is a timing diagram illustrating the timing of the actions of the apparatus 1, the operation of the controller 10 during normal play is as follows.

Assume that playback has reached interleaved unit IU(i). At time t1, the controller 30 controls the optical head 5 to be positioned to read the first audio stream block ASB1(i); this audio stream is stored in audio buffer MA.

At time t2, the controller 30 controls the optical head 5 to jump to the start location of the second graphics stream block GSB2(i), and at time t3, reading of this second graphics stream block GSB2(i) starts; this graphics stream is stored in graphics buffer MG.

At time t4, the controller 30 controls the optical head 5 to jump to the start location of the second angle video stream block VSB2(i), and at time t5, reading of this second angle video stream block VSB2(i) starts; this video stream is stored in video buffer MV.

As soon as, at time t6, the amount of data in the video buffer MV corresponds to at least one picture, decoding and display can start. The controller 30 reads the video information from video buffer MV, the graphics information from graphics buffer MG, and the audio information from audio buffer MA, executes the required decoding, and provides corresponding image and sound signals to the display device 20.

When, at time t7, the optical head 5 has reached the end of second angle video stream block VSB2(i), the controller 30 controls the optical head to jump to the start location of the first audio stream block ASB1(i+1) of the next interleaved unit IU(i+1), and at time t8 the above-described process is repeated for the next interleaved unit IU(i+1): first audio stream block ASB1(i+1) is read, second graphics stream block GSB2(i+1) is read, and then the optical head is positioned to read the second angle video stream block VSB2(i+1). In the time interval t7(i)-t6(i+1) required for jumping to the start location of the first audio stream block ASB1(i+1), reading this first audio stream block ASB1(i+1), jumping to the start location of the second graphics stream block GSB2(i+1), reading this second graphics stream block GSB2(i+1), jumping to the start location of the second angle video stream block VSB2(i+1), and reading the first picture of the second angle video stream block VSB2(i+1), display is continued by reading information from the buffers MA, MG, MV.

It should be clear to a person skilled in the art that the above steps are continued for the duration of the movie.

Figure 5A:
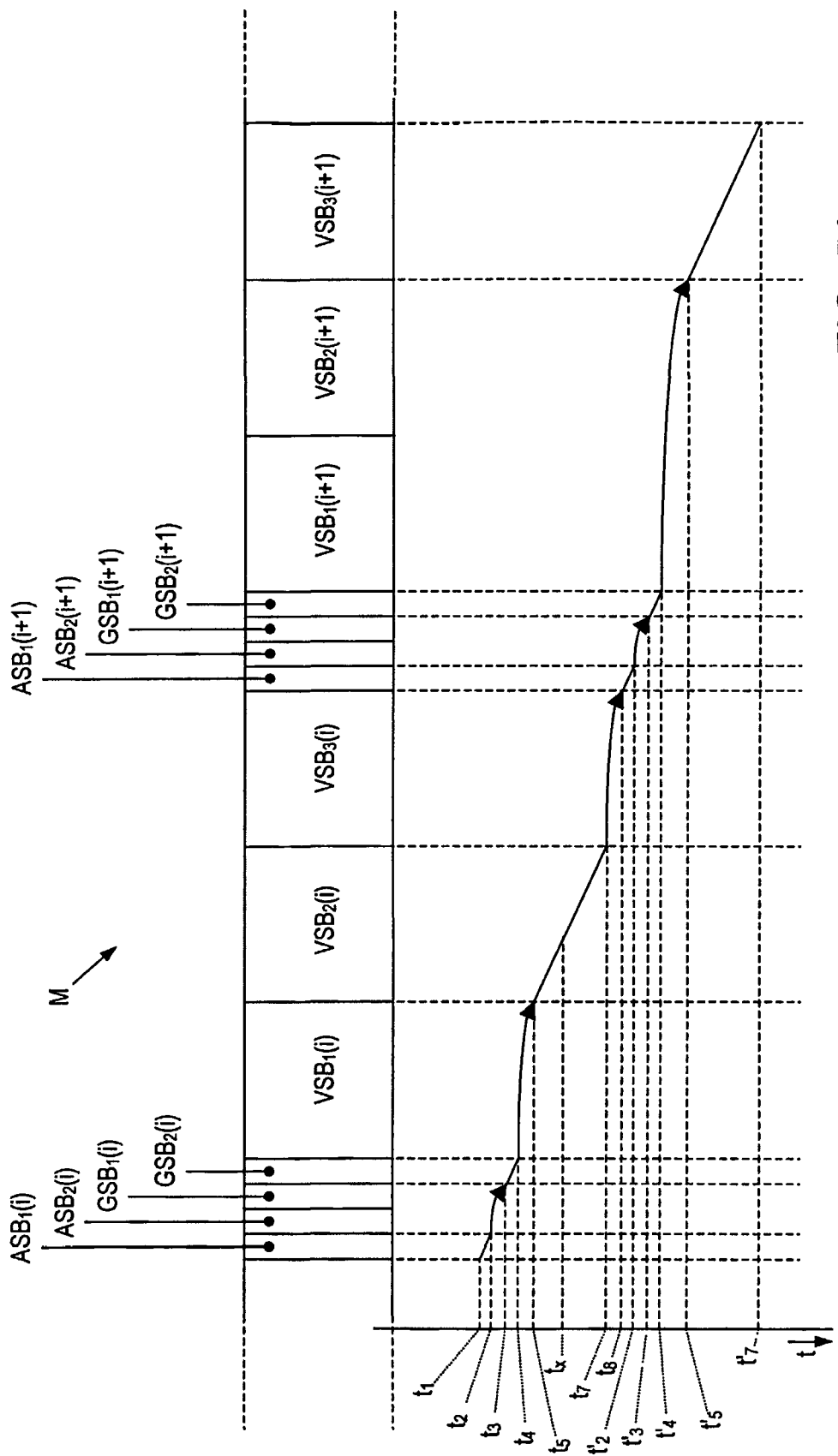
FIG. 5A is a timing diagram schematically illustrating the positioning of an optical head as a function of time during normal play.
Figure 5B:
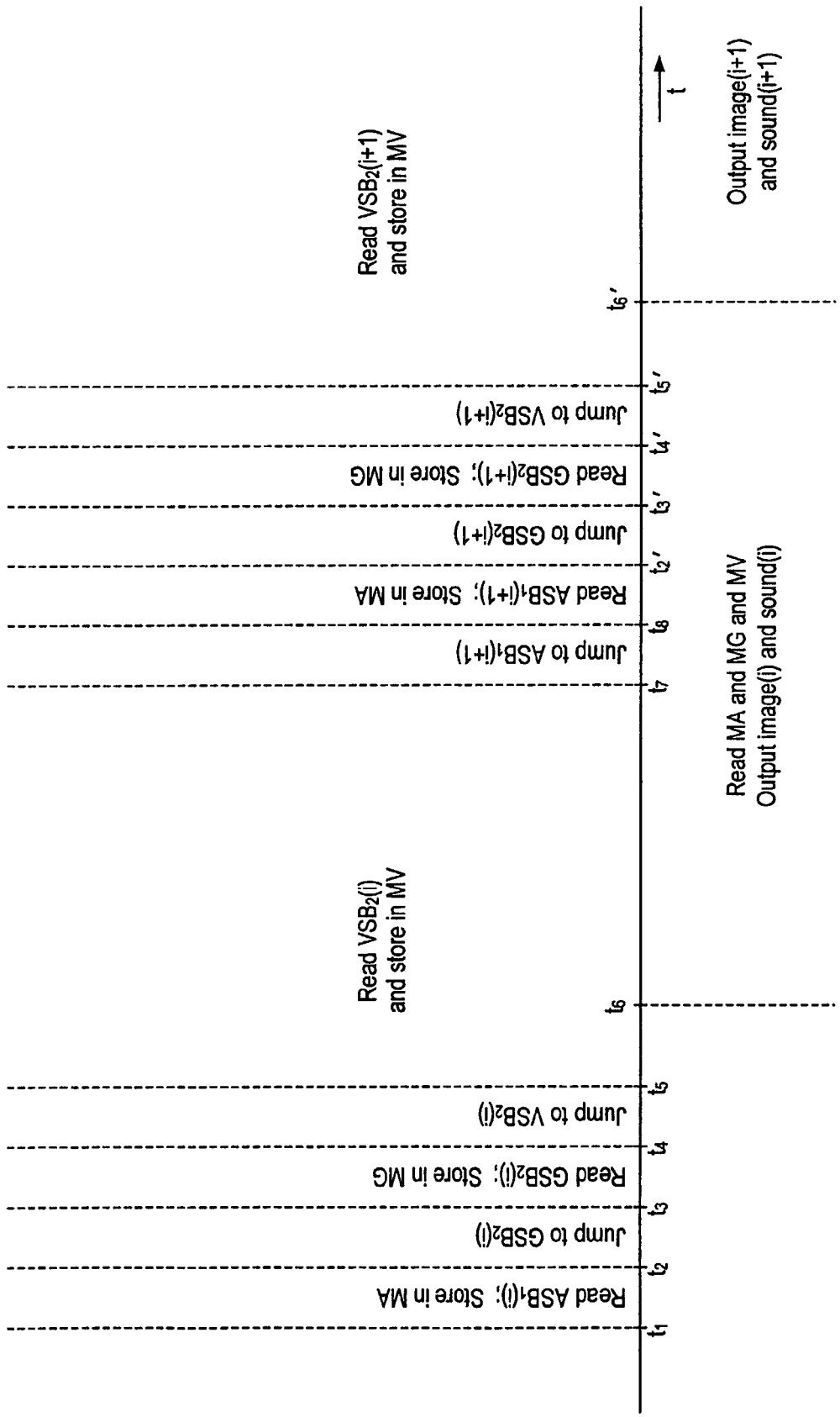
FIG. 5B is a timing diagram schematically illustrating the timing of actions of a disc drive apparatus during normal play.

Assume that, at some time tx during the time interval t5-t7 of interleaved unit IU(i), the user gives a command to change viewing angle, more particularly a command to change to the third video stream VS3 (see FIGS. 5A and 6).

Until time t4' of the next interleaved unit IU(i+1), operation continues as described above, i.e. the audio stream block ASB1(i+1) is read and stored, and the graphics stream block GSB2(i+1) is read and stored. Then, at time t4', the controller 30 controls the optical head 5 to jump to the start location of the third angle video stream block VSB3(i+1), and at time t5', reading of this third angle video stream block VSB3(i+1) starts; this video stream is stored in video buffer MV. Display of this third angle video stream block VSB3(i+1) starts at time t6'. The time interval from the time tx of the user command till the time t6' of the start of display of the third video stream is indicated as the reaction time of the system.

It is noted that, during normal play, the transition from current interleaved unit IU(i) to next interleaved unit IU(i+1) always involves jumping in two stages. A first jump stage (t7-t8) brings the optical head 5 from the video information in the current interleaved unit IU(i) to the audio/graphics information in the next interleaved unit IU(i+1), whereas a second jump stage (t4'-t5') brings the optical head 5 from the audio/graphics information in the next interleaved unit IU(i+1) to the video information in the in the next interleaved unit IU(i+1). Thus, the duration of each jump stage depends on the identity of the video stream being played. In the example discussed, the first jump stage involves jumping over one video stream block, i.e. the third video stream block VSB3(i), whereas the second jump stage involves jumping over one video stream block, i.e. the first video stream block VSB1(i+1). The duration of the transition from current interleaved unit to next interleaved unit will be almost independent from the identity of the video stream being played, as it always involves jumping over two video stream blocks, although it is noted that the jump time as a function of the jump distance is not a linear function.

In case of a change in viewing angle, the duration of the transition from current interleaved unit IU(i) to next interleaved unit IU(i+1) may be longer or shorter as compared with normal play. In the present example, if the user changes to the first viewing angle, the second jump stage involves no jump over any video stream block any more. If, however, the user changes to the third viewing angle, the second jump stage involves jumping over two video stream blocks VB1(i+1) and VB2(i+1).

When designing the disc drive 10, the size of the buffers MA, MG, MV should be selected to accommodate the longest jump times to be expected, in relation to block size, bit rate, etc. Or, conversely, when designing the recording/playback system, the size of the blocks should be selected in relation to the maximum buffer size, the bite rate, etc.

In the following, a numerical example will be given, based on a presentation duration (t6-t6') of 4 sec for one interleaved unit.

Assuming an audio bit rate of 384 kbps, 4 seconds of play time corresponds to a size of almost 200 kB for the audio blocks, corresponding to approximately 3 ECC blocks, taking into account that, in the BD system, the size of an ECC block is 64 kbyte. In case of two selectable audio streams (e.g. two languages), the size of the audio part of the interleaved units is almost 400 kB. The size of the audio buffer memory MA should be at least 200 kB.

Assuming a graphics bit rate of 192 kbps, 4 seconds of play time corresponds to a size of almost 100 kB for the graphics blocks. In case of two selectable graphics streams (e.g. two subtitles), the size of the graphics part of the interleaved units is almost 200 kB. The size of the graphics buffer memory MG should be at least 100 kB.

Assuming an average video bit rate of 24 Mbps, 4 seconds of play time corresponds to a size of 12 MB for the video blocks, corresponding to approximately 200 ECC blocks. In case of three selectable video streams (three viewing angles), the size of the video part of the interleaved units is 36 MB. The overall length of the interleaved units is approximately 36.6 MB, corresponding to approximately 580 ECC blocks.

During normal play, assuming that reading takes place at 54 Mbps, the time duration of the actions of the disc drive 10 is as illustrated in the table below.

| time interval | action | duration |
| --- | --- | --- |
| t1-t2 | read AS1: 200 kB @ 54 Mbps | 30 ms |
| t2-t3 | jump to GS2 (jump size <6 ECC blocks) | 100 ms |
| t3-t4 | read GS2: 100 kB @ 54 Mbps | 15 ms |
| t4-t5 | jump to VS2 (jump size 200 ECC blocks) | 120 ms |
| t5-t7 | read VS2: 12 MB @ 54 Mbps | 1.8 sec |
| t7-t8 | jump to AS1 (jump size 200 ECC blocks) | 120 ms |

The overall time duration of these actions is approximately 2.185 sec, substantially less than the 4 sec playtime, so the drive can be idle for somewhat less than 2 sec.

In this example, it is possible to use interleaved units having a duration of 2.5 seconds, corresponding to 5 GOPs; this decreases the reaction time and also decreases the buffer size.

In case of a change in viewing angle, in the most disadvantageous circumstances (current angle=VS1, new angle=VS3), the time duration of the actions of the disc drive 10 is as illustrated in the table below.

| time interval | action | duration |
|---|---|---|
| t1-t2 | read AS1: 200 kB @ 54 Mbps | 30 ms |
| t2-t3 | jump to GS2 (jump size <6 ECC blocks) | 100 ms |
| t3-t4 | read GS2: 100 kB @ 54 Mbps | 15 ms |
| t4-t5 | jump to VS1 (jump size 0 ECC blocks) | <100 ms |
| t5-t7 | read VS1: 12 MB @ 54 Mbps | 1.8 sec |
| t7-t8/t1' | jump to AS1 (jump size 400 ECC blocks) | 150 ms |
| t1'-t2' | read AS1: 200 kB @ 54 Mbps | 30 ms |
| t2'-t3' | jump to GS2 (jump size <6 ECC blocks) | 100 ms |
| t3'-t4' | read GS2: 100 kB @ 54 Mbps | 15 ms |
| t4'-t5' | jump to VS3 (jump size 400 ECC blocks) | 150 ms |
| t5'-t7' | read VS3: 12 MB @ 54 Mbps | 1.8 sec |

The overall time duration of these actions between the end of reading the current video block (t7) and the end of reading the next video block (t7') is now approximately 2.245 sec, slightly more than during normal play, but still substantially less than the 4 sec playtime, so the drive can be idle for somewhat less than 2 sec.

It should be clear to a person skilled in the art that the present invention is not limited to the exemplary embodiments discussed above, but that several variations and modifications are possible within the protective scope of the invention as defined in the appending claims.

For instance, in the above, with reference to FIG. 3A, the audio blocks are shown as being written before the graphics blocks, but this order may be reversed.

Further, the audio stream is an example of a first type common information stream, and the graphics stream is an example of a second type common information stream. Thus, in the example discussed, the information stream comprises two different types of common information stream. The present invention is however not limited to this number of common information stream types. This number may be less than two; for instance, a movie may be free from graphics. On the other hand, such number may be three or more.

Further, in the example discussed, the number of selectable first type information streams (two audio streams) is equal to the number of selectable second type information streams (two graphics streams). More generally, however, the number of selectable information streams may differ from type to type; such number may even be equal to one.

Further, in the above, the present invention has been explained for a situation where the video blocks must be read and displayed entirely before a jump to a next interleaved unit can be made. In a related invention by the present inventor, a system is proposed where this limitation does not apply, so that a jump to a next interleaved unit can be made before the current video block has ended. It should be clear that such can easily be applied in combination with the present invention.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. Method for recording an information stream on a record medium, the information stream comprising a plurality of alternative streams and at least one common part, wherein the alternative streams of the information stream are recorded in an interleaved manner;
   a processor dividing each of the alternative information streams into alternative information stream blocks;
   a processor dividing each of the common information stream parts into common information stream blocks;
   and using media write means for recording the information stream on a physical media as a succession of consecutive interleaved units, each interleaved unit comprising one and only one corresponding block of each of the common information stream parts and one and only one corresponding block of each of the alternative information streams, the common information stream blocks being separate from the alternative information stream blocks.

2. Method according to claim 1, wherein two or more of the common information stream blocks of one interleaved unit are combined into one multiplexed block separate from the alternative information stream blocks.

3. Method according to claim 1, wherein the information stream comprises a plurality of selectable common streams of different type;
   and wherein, in each interleaved unit, a plurality of selectable blocks is recorded, each selectable block corresponding to a respective one of said plurality of selectable common streams.

4. Method according to claim 1, wherein the information stream is an audiovisual stream comprising a plurality of alternative moving pictures, one or more common audio streams, and optionally one or more common graphics streams.

5. Method according to claim 4, wherein the audiovisual stream comprises NA user-selectable audio streams, NG user-selectable graphics streams, and NV user-selectable video streams;
   and wherein, in each interleaved unit, NA audio blocks and NG graphics blocks and NV video blocks are recorded.

6. Method according to claim 1, wherein the record medium is an optical disc.

7. Non-transitory record medium, readable by processing apparatus, containing an information stream comprising a plurality of alternative streams to be selectively outputted and at least one common stream to be outputted simultaneously with the selected alternative stream, said streams being recorded on said medium in an interleaved manner;
   wherein a track of the record medium contains a succession of consecutive interleaved units, each interleaved unit comprising one and only one corresponding block; of each of the common information stream parts and one and only one corresponding block of each of the alternative information stream parts, the common information stream blocks being separate from the alternative information stream blocks.

8. Record medium according to claim 7, wherein two or more of the common information stream blocks of one interleaved unit are combined into one multiplexed block separate from the alternative information stream blocks.

9. Record medium according to claim 7, wherein the information stream is an audiovisual stream comprising a plurality of alternative moving pictures, one or more common audio streams, and optionally one or more common graphics streams.

10. Record medium according to claim 9, wherein the audiovisual stream comprises NA user-selectable audio streams, NG user-selectable graphics streams, and NV user-selectable video streams;

and wherein each interleaved unit comprises NA audio blocks and NG graphics blocks and NV video blocks.

11. Method for reading a record medium according to claim 7, the method comprising the steps of:
a) selecting at least one common information stream;
b) selecting one of the alternative information streams;
c) reading the common information stream block of said at least one selected common information stream associated with one interleaved unit;
d) storing the information from the one common block read into a buffer memory;
e) reading the alternative information stream block of the selected one of the alternative information streams associated with said one interleaved unit;
f) simultaneously outputting the alternative information stream block in combination with the common information stream block from said buffer memory.

12. Method according to claim 11, wherein steps a-f are repeated for each following interleaved unit.

13. Method according to claim 11, wherein the information stream recorded on said record medium comprises a plurality of selectable common streams of different type;
and wherein each interleaved unit comprises a plurality of selectable blocks; each corresponding to a respective one of said plurality of selectable common streams;
the method comprising the steps of:
a) for each common stream type, selecting one of said plurality of selectable common streams;
b) selecting one of the alternative information streams;
c) for a first common stream type, reading the block of the selected common stream associated with one interleaved unit;
d) storing the information from this block in a buffer memory of first type;
d2) repeating steps a-d for all remaining common stream types;
e) reading the alternative information stream block of the selected one of the alternative information streams associated with said one interleaved unit;
f) simultaneously outputting the alternative information stream block in combination with all common information stream blocks from the buffer memories.

14. Drive for reading a record medium according to claim 7, the drive comprising:
a) means for selecting at least one common information stream;
b) means for selecting one of the alternative information streams;
c) means for reading the common information stream block of said at least one selected common information stream associated with one interleaved unit;
d) means for storing the information from the one common block read into a buffer memory;
e) means for reading the alternative information stream block of the selected one of the alternative information streams associated with said one interleaved unit;
f) means for simultaneously outputting the alternative information stream block in combination with the common information stream block from said buffer memory.

15. Drive according to claim 14, comprising:
reading means for reading the record medium;
an actuator for positioning the reading means with respect to the track of the record medium;
a controller for controlling the actuator, the controller having an input receiving a read signal from said reading means; the controller being provided with at least one buffer memory for storing the blocks of at least one of the common information streams.

16. Drive according to claim 14, wherein the information stream recorded on said record medium comprises a plurality of selectable common streams of different type;
and wherein each interleaved unit comprises a plurality of selectable blocks each corresponding to a respective one of said plurality of selectable common streams;
the drive comprising:
a) means for each common stream type, selecting one of said plurality of selectable common streams;
b) means for selecting one of the alternative information streams;
c) means for a first common stream type, reading the block of the selected common stream associated with one interleaved unit;
d) means for storing the information from this block in a buffer memory of first type;
d2) means for repeating steps a-d for all remaining common stream types;
e) means for reading the alternative information stream block of the selected one of the alternative information streams associated with said one interleaved unit;
f) means for simultaneously outputting the alternative information stream block in combination with all common information stream blocks from the buffer memories,
wherein the controller is provided with a plurality of buffer memories of different type, for storing the blocks of the selected common information streams of different type.

17. Drive according to claim 14, further comprising a buffer memory for storing information from the selected alternative information stream.

18. Drive according to claim 14, further comprising user input means for allowing a user to input a selection of an alternative information stream and a selection of at least one common information stream.

19. Audio/video reproduction system, comprising a disc drive claim 14, the system further comprising a display device comprising at least one screen for displaying images and at least one loudspeaker for generating sound.

* * * * *